United States Patent
Ma et al.

(10) Patent No.: US 10,374,434 B2
(45) Date of Patent: Aug. 6, 2019

(54) ENERGY MANAGEMENT SYSTEM

(71) Applicant: Murata Manufacturing Co., Ltd., Nagaokakyo-shi, Kyoto-fu (JP)

(72) Inventors: Yue Ma, Nagaokakyo (JP); Hitoshi Tsuji, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 218 days.

(21) Appl. No.: 15/624,784

(22) Filed: Jun. 16, 2017

(65) Prior Publication Data

US 2017/0288410 A1 Oct. 5, 2017

Related U.S. Application Data (63) Continuation of application No. PCT/JP2016/052075, filed on Jan. 26, 2016.

(30) Foreign Application Priority Data

Apr. 22, 2015 (JP) .................. 2015-087256

(51) Int. Cl.
- H02J 3/38 (2006.01)
- H02J 7/35 (2006.01)
- H02J 7/00 (2006.01)

(52) U.S. Cl.
CPC .............. H02J 3/385 (2013.01); H02J 3/383 (2013.01); H02J 7/0013 (2013.01); H02J 7/35 (2013.01); Y02E 10/58 (2013.01); Y02P 90/50 (2015.11)

(58) Field of Classification Search
CPC .. H02J 3/385; H02J 7/0013; H02J 7/35; H02J 3/382; H02J 3/383; H02J 3/00; Y02P 90/50; Y02E 10/58
See application file for complete search history.

(56) References Cited

U.S. PATENT DOCUMENTS 9,190,915 B2 * 11/2015 Inoue ................ H02M 3/33507

FOREIGN PATENT DOCUMENTS

| JP | 2005-224009 A | 8/2005 |
| JP | 2014-222982 A | 11/2014 |
| JP | 2014-230366 A | 12/2014 |
| JP | 2015-27203 A | 2/2015 |

OTHER PUBLICATIONS

International Search Report issued in International Application No. PCT/JP2016/052075, dated Apr. 19, 2016.
Written Opinion of the International Searching Authority issued in International Application No. PCT/JP2016/052075, dated Apr. 19, 2016.

* cited by examiner

*Primary Examiner* — Jung Kim
(74) *Attorney, Agent, or Firm* — Arent Fox LLP (57) ABSTRACT

An energy management system that includes a power generating device, bidirectional DC-DC converter, and inverter connected to an HVDC bus. A gain of a voltage change to a current change in the bidirectional DC-DC converter is equal to the gain in the inverter. When an output power of the inverter or the bidirectional DC-DC converter varies in response to a variation in an output current of the power generating device, the energy management system can control the output power of the inverter to conform to a target value by adjusting an offset of gain characteristics of the bidirectional DC-DC converter to gain characteristics of the inverter. As a result, the energy management system is capable of stabilizing the output power of the inverter.

8 Claims, 8 Drawing Sheets

ENERGY MANAGEMENT SYSTEM

CROSS REFERENCE TO RELATED APPLICATIONS

The present application is a continuation of PCT/JP2016/052075 filed Jan. 26, 2016, which claims priority to Japanese Patent Application No. 2015-087256, filed Apr. 22, 2015, the entire contents of each of which are incorporated herein by reference.

TECHNICAL FIELD

The present disclosure relates to an energy management system that uses power generated in a home environment, factory, or the like.

BACKGROUND

A power generator, for example, a photovoltaic power generating system that uses power generated by solar panels in a home environment or the like includes a direct-current voltage bus that transmits power generated by the power generator or power stored in a secondary battery to a power system (hereinafter referred to as HVDC bus). The HVDC bus is connected to a PV converter, inverter, bidirectional DC-DC converter, and the like. The PV converter outputs power generated by the photovoltaic power generating device at a predetermined voltage. The bidirectional DC-DC converter is connected to the secondary battery and converts a direct-current voltage delivered between the secondary battery and HVDC bus into a predetermined constant voltage. In such a photovoltaic power generating system, if the HVDC bus voltage varies because of fluctuations in the amount of power generation in the photovoltaic power generating device, the invertor may be unable to output constant power with stability.

Patent Document 1 (identified below) discloses a power supply system in which a plurality of power supply units, such as photovoltaic power generating units, are connected to a direct-current bus (e.g., a HVDC bus). Each of the power supply units autonomously determines the amount of power delivered between it and the direct-current bus on the basis of a direct-current bus voltage. The power supply system described in Patent Document 1 adjusts the amount of power output by the power supply units by changing the slope of the voltage-current characteristics of each of the power supply units and thus suppresses variation in the direct-current bus voltage.

Patent Document 1: Japanese Unexamined Patent Application Publication No. 2005-224009.

However, with the method for suppressing variation in the direct-current bus voltage by changing the slope of the voltage-current characteristics, as described in Patent Document 1, the control can be quite complex and unstable, and the invertor may be unable to output constant power with stability.

SUMMARY

Accordingly, it is an object of the present disclosure to provide an energy management system capable of stabilizing output power of an inverter by simple control.

An energy management system as disclosed herein includes a direct-current voltage bus, a power generating device connected to the direct-current voltage bus and configured to generate power and output the power to the direct-current voltage bus, at least one bidirectional DC-DC converter connected to the direct-current voltage bus and configured to receive a direct-current voltage from the direct-current voltage bus or output a direct-current voltage to the direct-current voltage bus, and an inverter connected to the direct-current voltage bus and configured to convert the direct-current voltage received from the direct-current voltage bus into an alternating-current voltage. Moreover, according to the exemplary aspect, the gain of a voltage change to a current change in the inverter is equal to the gain in the bidirectional DC-DC converter. Moreover, the energy management system further includes a controller configured to control the output power of the inverter. Thus, when an output power of the inverter or the bidirectional DC-DC converter varies in response to a variation in an output current of the power generating device, the controller will drive the output power of the inverter towards a target value by adjusting an offset of gain characteristics of the bidirectional DC-DC converter to gain characteristics of the inverter or an offset of the gain characteristics of the inverter to the gain characteristics of the bidirectional DC-DC converter.

In this configuration, the output power of the inverter is driver towards the target value by equalizing the gain in the inverter and that in the bidirectional DC-DC converter and adjusting the offset of the gain characteristics of each of them. In this case, even when the amount of power generation by the power generating device decreases (or increases), the output power of the inverter can be stabilized. Controlling of stabilizing the output power of the inverter can be easier than controlling of changing the slope of the gain.

In the energy management system disclosed herein, the at least one bidirectional DC-DC converter may include a plurality of bidirectional DC-DC converters, and the controller may be configured to adjust the offset of the gain characteristics for each of the plurality of bidirectional DC-DC converters.

In this configuration, even when the plurality of bidirectional DC-DC converters are included, the output power of the inverter can be stabilized by simple control.

In the energy management system disclosed herein, the power generating device may preferably be a photovoltaic power generating device and be configured to find and track a current value and a voltage value at which the output power is maximized.

In this configuration, the amount of power generation varies depending on the environment (place, weather, or the like), and the maximum power adjusted to the environment can be output from the power generating device.

According to the present disclosure, an energy management system is provided that enables the output power of the inverter to be stabilized by simple control.

DETAILED DESCRIPTION OF EXEMPLARY EMBODIMENTS

Figure 1:
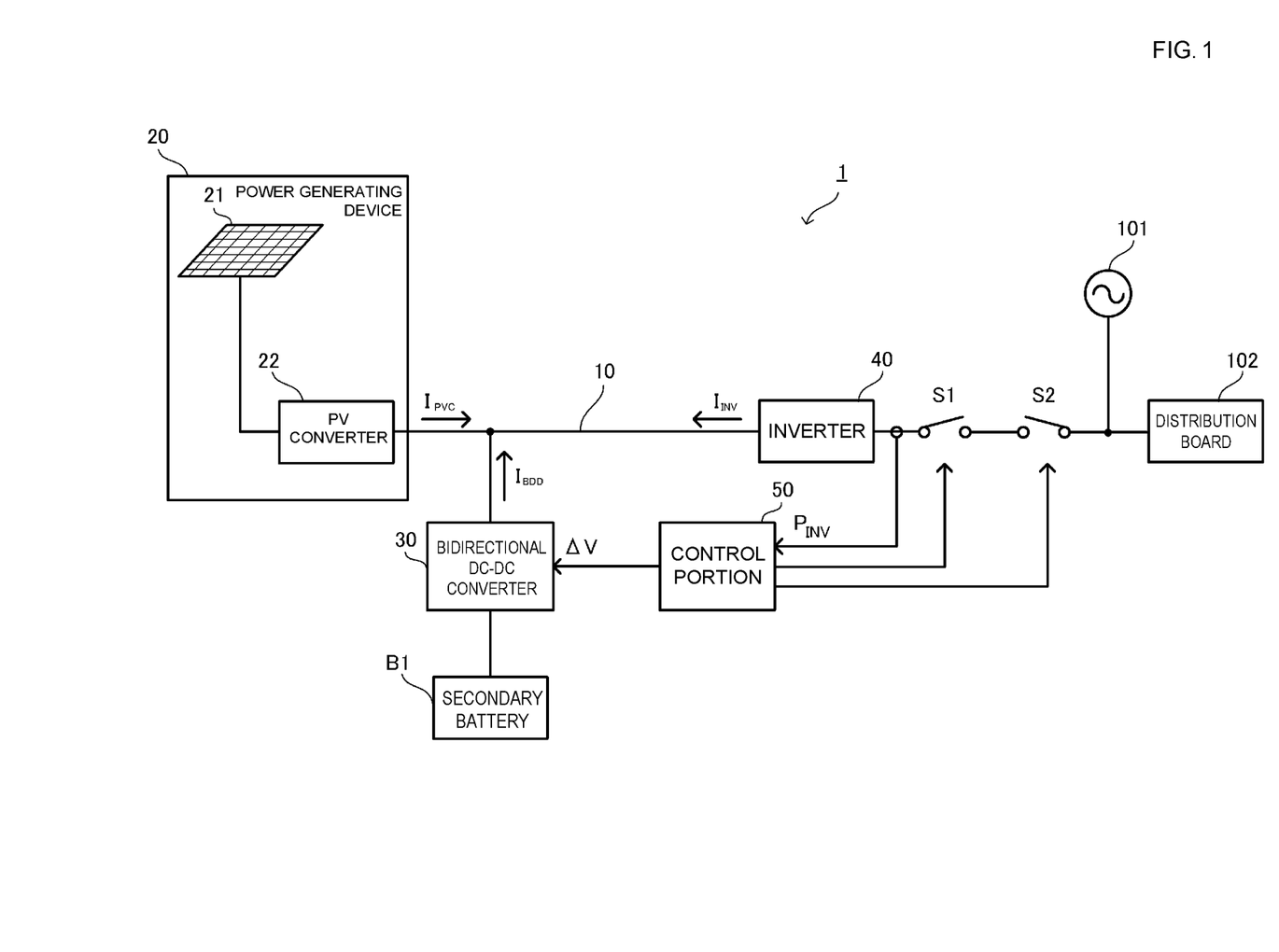
FIG. 1 illustrates an energy management system according to an exemplary embodiment.

FIG. 1 illustrates an energy management system 1 according to an exemplary embodiment.

As shown, the energy management system 1 includes a power generating device 20, bidirectional DC-DC converter 30, inverter 40, and control portion 50. As further shown, the power generating device 20, bidirectional DC-DC converter 30, and inverter 40 are connected to an HVDC ("high-voltage, direct current") bus 10.

The power generating device 20 includes a photovoltaic panel 21 and a PV converter 22. The PV ("photovoltaic") converter 22 outputs power generated by the photovoltaic panel 21 to the HVDC bus 10. The power generating device 20 may be an aerogenerator, gas power generating device, or the like.

The power generating device 20 performs maximum power point tracking ("MPPT") control of detecting an output voltage and output current and maximizing an output power on the basis of the output voltage and output current. The amount of power generation in the power generating device 20 varies depending on the environment (place, weather, or the like). The power generating device 20 detects the output voltage and output current while changing the output current, compares the powers (output current×output voltage) before and after the output current is changed, finds a maximum power point, and tracks it. In this manner, the power generating device 20 can output the maximum power adjusted to the present environment.

The bidirectional DC-DC converter 30 is connected to a secondary battery B1. The bidirectional DC-DC converter 30 transforms (increases or decreases) a direct-current voltage output from the PV converter 22 to the HVDC bus 10 and charges it into the secondary battery B1. The bidirectional DC-DC converter 30 transforms the direct-current voltage charged in the secondary battery B1 and outputs it to the HVDC bus 10. A switch (not illustrated) may be provided between the bidirectional DC-DC converter 30 and secondary battery B1. For example, when the secondary battery B1 becomes fully charged, the switch may be turned off.

The inverter 40 is connected to a power system 101 and distribution board 102 with switches S1 and S2 interposed therebetween. The distribution board 102 is connected to an AC output terminal (AC outlet or the like), which is not illustrated. The AC output terminal is connected to a load, such as a microwave oven, washing machine, or air conditioner. The switches S1 and S2 are in an ON position in ordinary times, in which no anomaly occurs in the power system 101. If an anomaly occurs in the power system 101 (e.g., power blackout or the like), the switches S1 and S2 are in an OFF position.

The inverter 40 converts a direct-current voltage input from the HVDC bus 10 into an alternating-current voltage and outputs it to the power system 101 or distribution board 102 or converts an alternating-current voltage input from the power system 101 into a direct-current voltage. The situations where power is supplied from the inverter 40 to the power system 101 are the situations where power generated by the power generating device 20 is sold to an electric power company.

The control portion 50 performs ON/OFF control on the switches S1 and S2 in accordance with the presence or absence of an anomaly in the power system 101. The control portion 50 performs control of making the voltage $V_{BUS}$ in the HVDC bus 10 constant (hereinafter referred to as bus voltage adjustment control). The amount of power generation in the power generating device 20 varies depending on the environment. When the amount of power generation by the power generating device 20 is small, the output power from the power generating device 20 is low and the voltage $V_{BUS}$ in the HVDC bus 10 decreases. In this case, an output power $P_{INV}$ output from the inverter 40 to the power system 101 (or distribution board 102) side also decreases. However, because the inverter 40 is connected to the power system 101 or distribution board 102, it is desired that the output power $P_{INV}$ from the inverter 40 be constant. Therefore, when the output power $P_{INV}$ of the inverter 40 varies, the control portion 50 causes the output power $P_{INV}$ to approach the target value $P_{INV}*$ by adjusting the current-voltage characteristics (gain characteristics) of the bidirectional DC-DC converter 30.

When the voltage $V_{BUS}$ is constant, the expression $P_{INV}+P_{PVC}+P_{BDD}=0$ stands, where $P_{PVC}$ denotes the output power of the power generating device 20 (PV converter 22) and $P_{BDD}$ denotes the output power of the bidirectional DC-DC converter 30. In this expression, each of $P_{INV}$, $P_{PVC}$, and $P_{BDD}$ is defined as positive in the direction extending from its corresponding circuit toward the HVDC bus 10. In the following description, this state is referred to as a balanced state of the HVDC bus 10.

In the following description, as illustrated in FIG. 1, the current output from the PV converter 22 is expressed as $I_{PVC}$, the current output from the bidirectional DC-DC converter 30 is expressed as $I_{BDD}$, and the current output from the inverter 40 is expressed as $I_{INV}$. Each of the currents $I_{PVC}$, $I_{BDD}$, and $I_{INV}$ is defined as positive in the direction extending from its corresponding circuit toward the HVDC bus 10.

Figure 2:
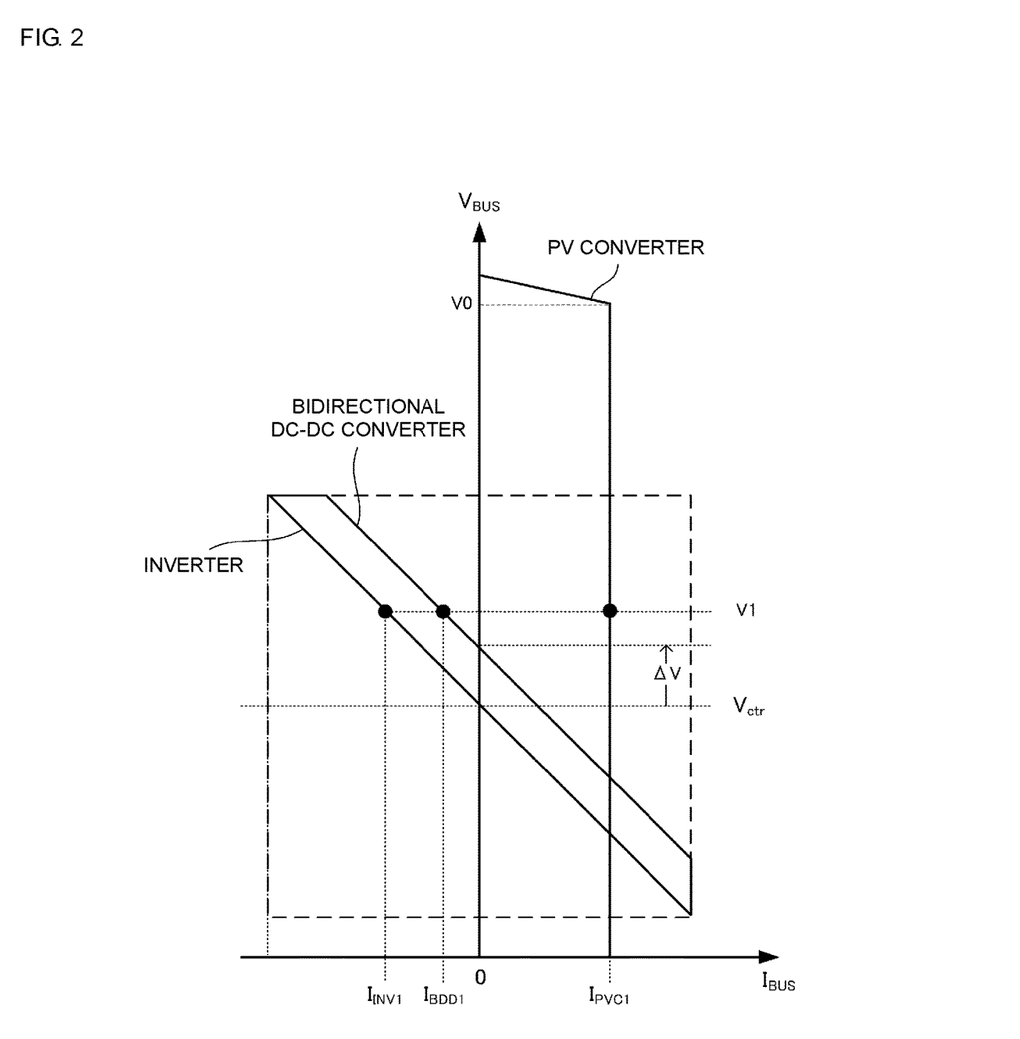
FIG. 2 illustrates one example of gain characteristics of a power generating device, bidirectional DC-DC converter, and inverter.
Figure 3:
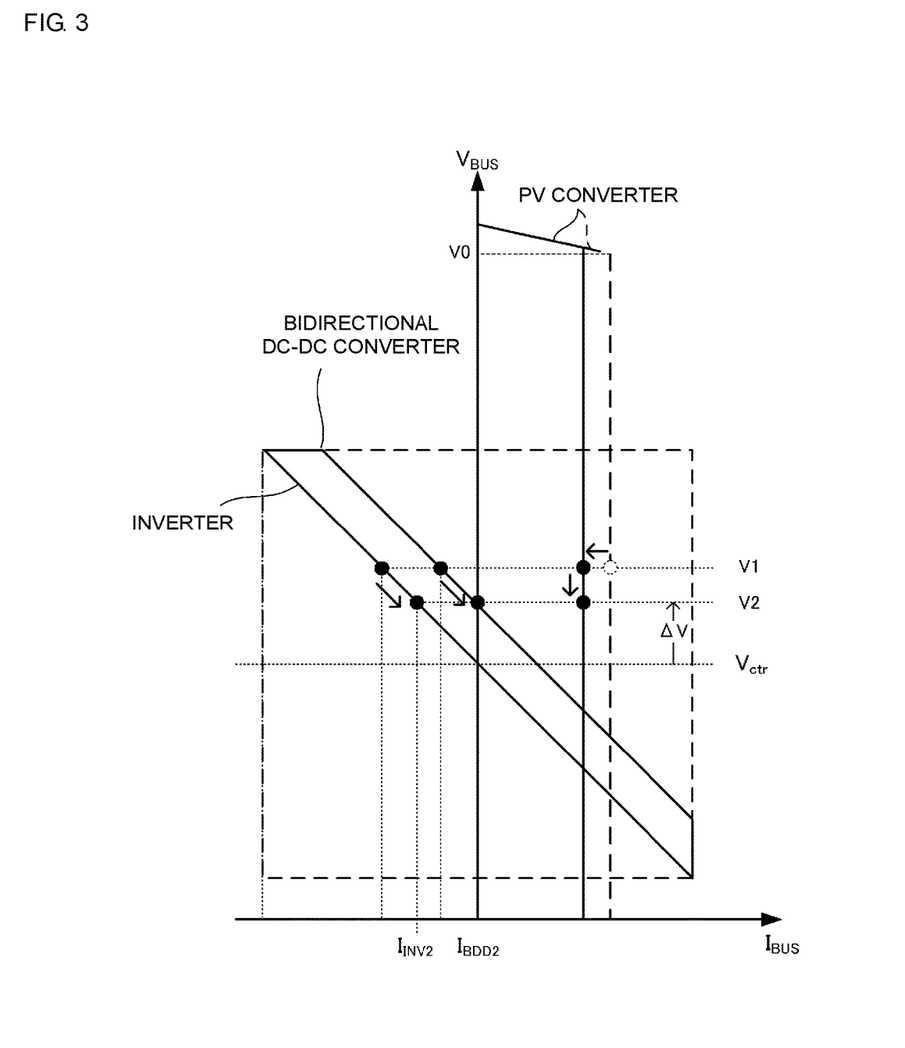
FIG. 3 illustrates one example of gain characteristics of the power generating device, bidirectional DC-DC converter, and inverter.
Figure 4:
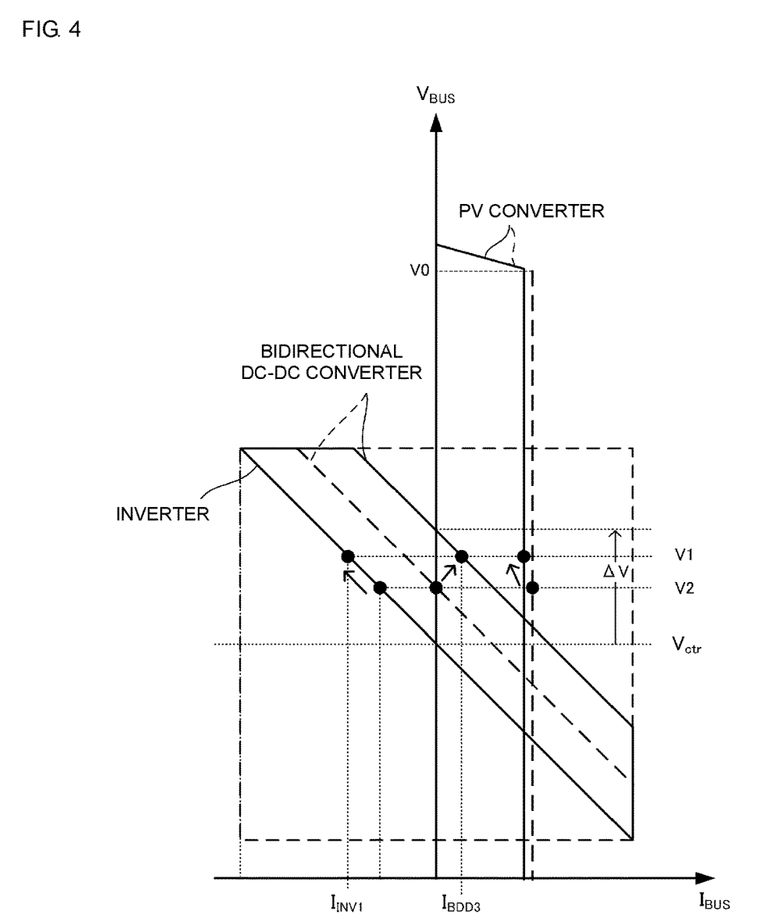
FIG. 4 illustrates one example of gain characteristics of the power generating device, bidirectional DC-DC converter, and inverter.

FIGS. 2, 3, and 4 illustrate example gain characteristics of the power generating device 20, bidirectional DC-DC converter 30, and inverter 40. FIG. 2 illustrates operating points when the amount of power generation is large. FIG. 3 illustrates operating points when the amount of power generation is small. FIG. 4 illustrates operating points when the control portion 50 performs the bus voltage adjustment control.

The horizontal axis in FIGS. 2 to 4 indicates the current $I_{BUS}$ in the HVDC bus 10, and the vertical axis therein indicates the voltage $V_{BUS}$ in the HVDC bus 10. The voltage $V_{CTR}$ illustrated in FIGS. 2 to 4 is a voltage set value (e.g., 380 V) in the HVDC bus 10 when the input/output current of the inverter 40 is zero.

In the present embodiment, the gain in the bidirectional DC-DC converter 30 and the gain in the inverter 40 are set to be equal. The gain is the ratio of a voltage change to a current change. That is, the slope (Rd) of the gain characteristics of the bidirectional DC-DC converter 30 and that of the inverter 40 illustrated in FIGS. 2 to 4 are equal. The gain characteristics of the inverter 40 can be expressed as $V_{BUS}=V_{CTR}-Rd*I_{BUS}(I_{INV})$. The gain characteristics of the bidirectional DC-DC converter 30 can be expressed as $V_{BUS}=V_{CTR}+\Delta V-Rd*I_{BUS}(I_{BDD})$. $\Delta V$ is an offset of the gain characteristics of the bidirectional DC-DC converter 30 to the gain characteristics of the inverter 40.

The power generating device 20 (specifically, PV converter 22) outputs constant power at all times. When the amount of power generation in the power generating device 20 varies depending on the environment, the power output from the power generating device 20 varies. For example, if the amount of power generation increases in fine weather, the power also increases. If the amount of power generation decreases in rainy weather, the power also decreases.

The voltage V0 illustrated in FIGS. 2 to 4 is a starting voltage for protecting operation by the power generating device 20. Although not illustrated in the drawings, the HVDC bus 10 is connected to a capacitor. If the output voltage from the power generating device 20 is unusually high, the capacitor may be broken. Thus, when the voltage $V_{BUS}$ exceeds the voltage V0, the power generating device 20 performs control of reducing the current to be output and protects the capacitor.

When the amount of power generation is large as illustrated in FIG. 2, the output power $P_{PVC1}$ of the PV converter 22 at the time when it outputs the voltage V1 and current $I_{PVC1}$ is V1×$I_{PVC1}$. When $V_{BUS}$=V1, the bidirectional DC-DC converter 30 outputs the current $I_{BDD1}$ and the inverter 40 outputs the current $I_{INV1}$. The output power $P_{BDD1}$ of the bidirectional DC-DC converter 30 at this time is V1×$I_{BDD1}$. The output power $P_{INV1}$ of the inverter 40 is V1×$I_{INV1}$. Because both $I_{BDD1}$ and $I_{INV1}$ are negative values, when $V_{BUS}$=V1, the bidirectional DC-DC converter 30 outputs power to the secondary battery B1 and the inverter 40 outputs power to the power system 101 (or distribution board 102) side.

The state indicated by the bullets in FIG. 2 is a balanced state of the HVDC bus 10 in the state where predetermined power is supplied to the power system 101 or distribution board 102. That is, $P_{INV1}$+$P_{PVC1}$+$P_{BDD1}$=0. In the present embodiment, the control portion 50 sets the target value $P_{INV}^*$=$P_{INV1}$ and performs the bus voltage adjustment control to enable the inverter 40 to output the power $P_{INV1}$ at all times.

When the amount of power generation is small illustrated in FIG. 3, because the amount of power generation by the power generating device 20 decreases, the gain characteristics of the PV converter 22 change from the waveform indicated by the broken line to the waveform indicated by the solid line. The output power of the PV converter 22 at this time is expressed as $P_{PVC2}$. In the case where the power $P_{INV1}$, which is the target value, is output from the inverter 40, when the output power of the bidirectional DC-DC converter 30 is expressed as $P_{BDD1}$, from the relationships $P_{INV1}$+$P_{PVC1}$+$P_{BDD1}$=0 and $P_{PVC2}$<$P_{PVC1}$, $P_{INV1}$+$P_{PVC2}$+$P_{BDD1}$≠0 and thus the HVDC bus 10 is not in the balanced state.

Accordingly, when the amount of power generation by the power generating device 20 decreases, the output power of the bidirectional DC-DC converter 30 and that of the inverter 40 are reduced. In this example, the output power of the bidirectional DC-DC converter 30 at this time is expressed as $P_{BDD2}$ (=V2×$I_{BDD2}$) and the output power of the inverter 40 at this time is expressed as $P_{INV2}$ (=V2×$I_{INV2}$), |$P_{BDD2}$|<|$P_{BDD1}$| and |$P_{INV2}$|<|$P_{INV1}$|.

When the output power $P_{INV}$ of the inverter 40 decreases from the target value $P_{INV}^*$ (=$P_{INV1}$), the control portion 50 increases the output power $P_{INV}$ of the inverter 40 by increasing the output power $P_{BDD}$ of the bidirectional DC-DC converter 30. The control portion 50 adjusts the offset ΔV in order to adjust the output power $P_{BDD}$ of the bidirectional DC-DC converter 30. Moreover, when the output power $P_{INV}$ of the inverter 40 increases from the target value $P_{INV}^*$ (=$P_{INV1}$), the control portion 50 reduces the output power $P_{INV}$ of the inverter 40 by reducing the output power $P_{BDD}$ of the bidirectional DC-DC converter 30.

FIG. 4 illustrates the gain characteristics of the bidirectional DC-DC converter 30 with the offset ΔV adjusted. The output power $P_{INV}$ of the inverter 40 in which the output power $P_{INV}$ decreases is made to be the target value $P_{INV}^*$ (=$P_{INV1}$). In this case, the output voltage $V_{INV}$ of the inverter 40 is V1. When $V_{BDD}$=V1, the bidirectional DC-DC converter 30 with the offset ΔV adjusted outputs the current $I_{BDD3}$. Because $I_{BDD3}$>$I_{BDD2}$, the output power $P_{BDD3}$ of the bidirectional DC-DC converter 30 increases from the output power $P_{BDD2}$ in FIG. 3. By the adjustment of the offset ΔV of the gain characteristics of the bidirectional DC-DC converter 30 in this way, the output power $P_{BDD3}$ of the bidirectional DC-DC converter 30 can be adjusted, and this can cause the output power $P_{INV}$ of the inverter 40 to approach the target value $P_{INV}^*$.

The power $P_{PVC}$ output from the power generating device 20 performing the MPPT control is constant. Accordingly, in FIG. 4, as the output voltage $V_{PVC}$ of the PV converter 22 (voltage $V_{BUS}$ in the HVDC bus 10) increases from V2 to V1, the gain characteristics of the PV converter 22 change from the waveform indicated by the broken line to the waveform indicted by the solid line, and the output current $I_{PVC}$ of the PV converter 22 decreases.

Figure 5:
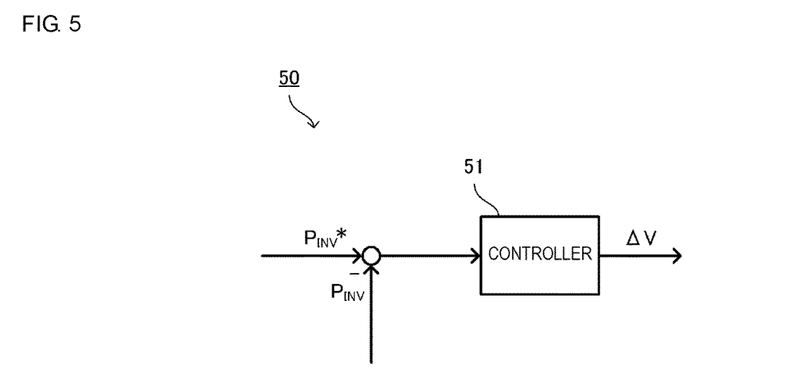
FIG. 5 illustrates a control block in a control portion.

FIG. 5 illustrates a control block in the control portion 50. The control portion 50 includes a controller 51, which can be a microcontroller or microprocessor configured to generate and adjust the offset Δ. In particular, the controller 51 compares the detected output power $P_{INV}$ of the inverter 40 and the target value $P_{INV}^*$ and outputs the offset ΔV for the bidirectional DC-DC converter 30.

In the balanced state of the HVDC bus 10, the expression $P_{INV}$+$P_{PVC}$+$P_{BDD}$=0 stands. The power $P_{PVC}$ output from the power generating device 20 performing the MPPT control is constant. Accordingly, as illustrated in FIG. 3, when the output power $P_{INV}$ of the inverter 40 decreases from the target value $P_{INV}^*$ (=$P_{INV1}$), the output power $P_{BDD}$ of the bidirectional DC-DC converter 30 is increased, which causes an increase in the output power $P_{INV}$ of the inverter 40. In the case illustrated in FIG. 3, the output power of the inverter 40 should be increased by Δ$P_{INV}$=$P_{INV}^*$−$P_{INV2}$. The controller 51 adjusts the offset ΔV by increasing the output power $P_{INV}$ until an error between the output power $P_{INV}$ and the target value $P_{INV}^*$ becomes zero.

Figure 6:
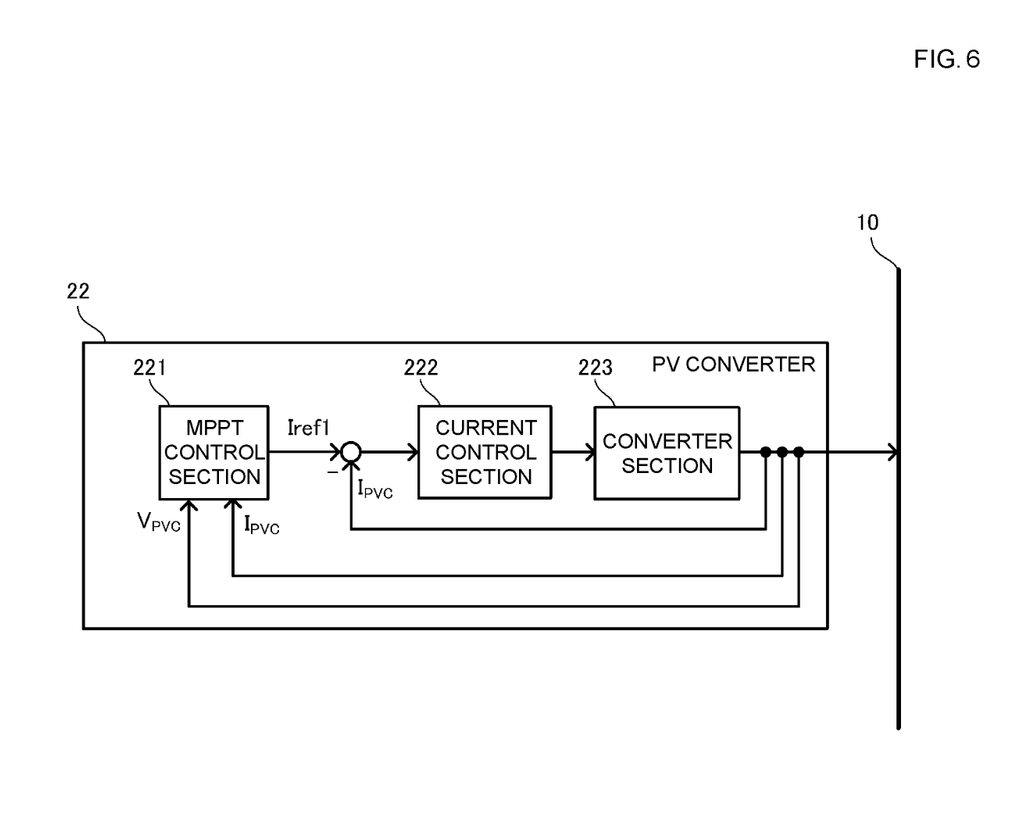
FIG. 6 illustrates a control block in a PV converter.

FIG. 6 illustrates a control block in the PV converter 22. The PV converter 22 includes an MPPT control section 221, a current control section 222, and a converter section 223.

The MPPT control section 221 receives feedback of values of the voltage $V_{PVC}$ and current $I_{PVC}$ output from the converter section 223. The MPPT control section 221 performs the maximum power point tracking control of maximizing the output power on the basis of the voltage $V_{PVC}$ and current $I_{PVC}$. The MPPT control section 221 detects the output current $I_{PVC}$ and output voltage $V_{PVC}$ while changing the output current $I_{PVC}$, compares the powers before and after the output current $I_{PVC}$ varies, and finds the current Iref1 corresponding to the maximum power point.

The current control section 222 performs PWM control on the converter section 223 on the basis of a result of comparison between the current Iref1 set (found) by the MPPT control section 221 and the output current $I_{PVC}$ of the converter section 223 and matches the output current $I_{PVC}$ of the converter section 223 to the current Iref1.

Figure 7:
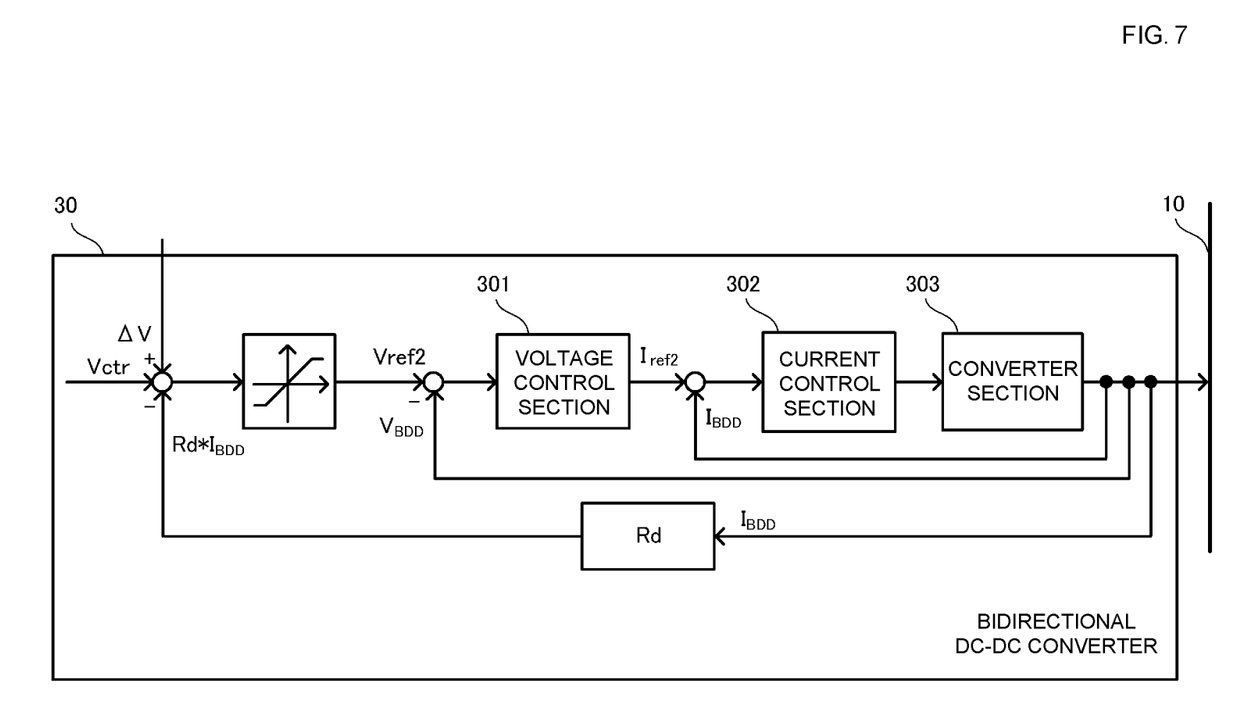
FIG. 7 illustrates a control block in the bidirectional DC-DC converter.

FIG. 7 illustrates a control block in the bidirectional DC-DC converter 30. The bidirectional DC-DC converter 30 includes a voltage control section 301, a current control section 302, and a converter section 303.

The voltage control section 301 compares the calculated voltage Vref2 and the output voltage $V_{BDD}$ of the converter section 303 and adjusts the current Iref2 such that the error becomes zero. The voltage Vref2 is calculated from Vref2=$V_{CTR}$+ΔV−Rd*$I_{BDD}$. ΔV is input from the control portion 50.

The current control section 302 performs the PWM control on the converter section 303 on the basis of a result of comparison between the current Iref2 calculated by the voltage control section 301 and the output current $I_{BDD}$ of the converter section 303 and matches the output current $I_{BDD}$ of the converter section 303 to the current Iref2.

Figure 8:
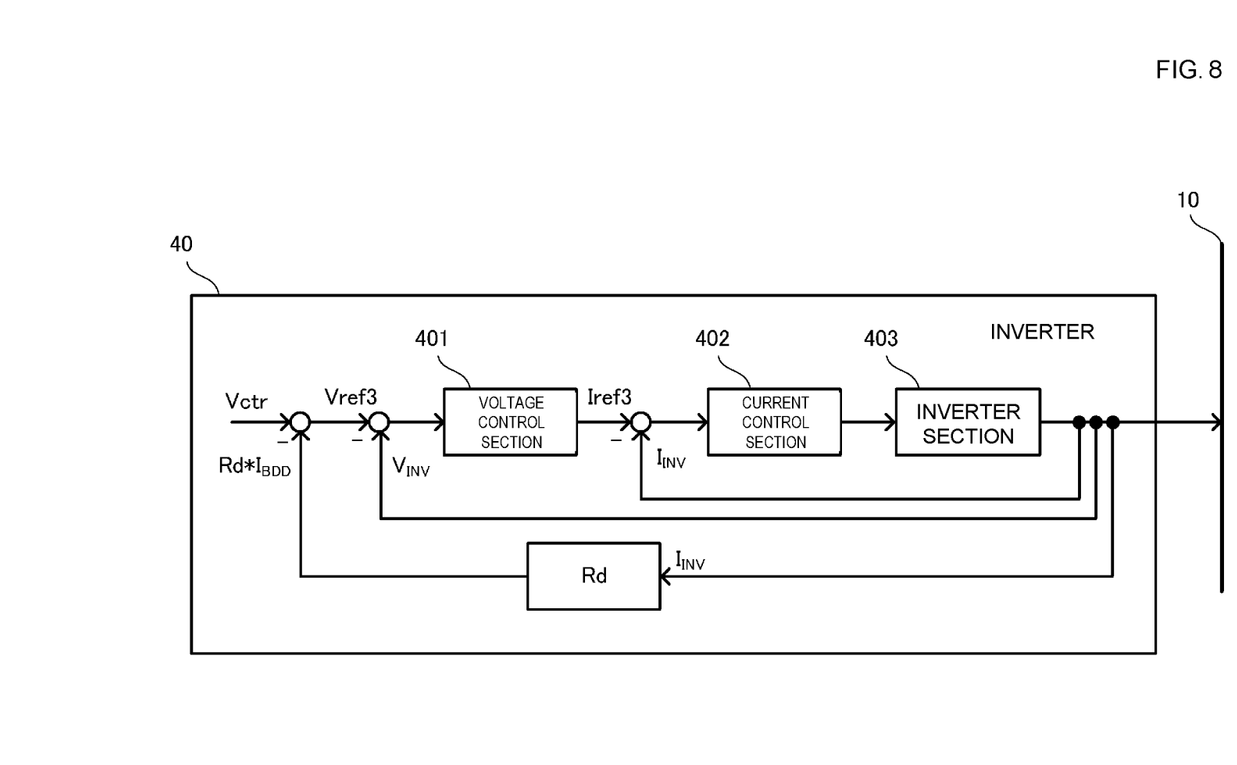
FIG. 8 illustrates a control block in the inverter.

FIG. 8 illustrates a control block in the inverter 40. The inverter 40 includes a voltage control section 401, current control section 402, and inverter section 403.

The voltage control section 401 calculates the current Iref3 for causing the inverter section 403 to output the voltage Vref3 on the basis of the calculated voltage Vref3 and the output voltage $V_{INV}$ of the inverter section 403. The voltage Vref3 is calculated from Vref3=$V_{CTR}$−Rd*$I_{BDD}$.

The current control section 402 performs the PWM control on the inverter section 403 on the basis of a result of comparison between the current Iref3 calculated by the voltage control section 401 and the output current $I_{INV}$ of the inverter section 403 and matches the output current $I_{INV}$ of the inverter section 403 to the current Iref3. The inverter section 403 converts a direct-current voltage into an alternating-current voltage.

As described above, in the present embodiment, the output power of the inverter 40 is made to be equal to the target value by adjustment of the offset ΔV of the gain characteristics of the bidirectional DC-DC converter 30. The offset ΔV may be calculated in the bidirectional DC-DC converter 30.

In the present embodiment, the output of the inverter 40 is detected to adjust the gain characteristics of the bidirectional DC-DC converter 30. The output of the inverter 40 may be detected to adjust the gain characteristics of the inverter 40. In this case, the gain characteristics of the bidirectional DC-DC converter 30 are fixed, and the calculated offset ΔV is the offset of the gain characteristics of the inverter 40 to the gain characteristics of the bidirectional DC-DC converter 30. In this configuration, because processing, such as detection of the output and calculation of the offset ΔV, can be completed in the inverter 40, communications between the bidirectional DC-DC converter 30 and the inverter 40 are not necessary.

In the present embodiment, the offset ΔV is calculated from the output power $P_{INV}$ of the inverter 40 and the target value $P_{INV}$*. Moreover, the output power $P_{BDD}$ of the bidirectional DC-DC converter 30, the target value $P_{BDD}$*, the offset ΔV may be calculated. In this case, the output power $P_{INV}$ from the inverter 40 is made to be the target value by causing the output power $P_{BDD}$ of the bidirectional DC-DC converter 30 to conform to the target value.

Figure 9:
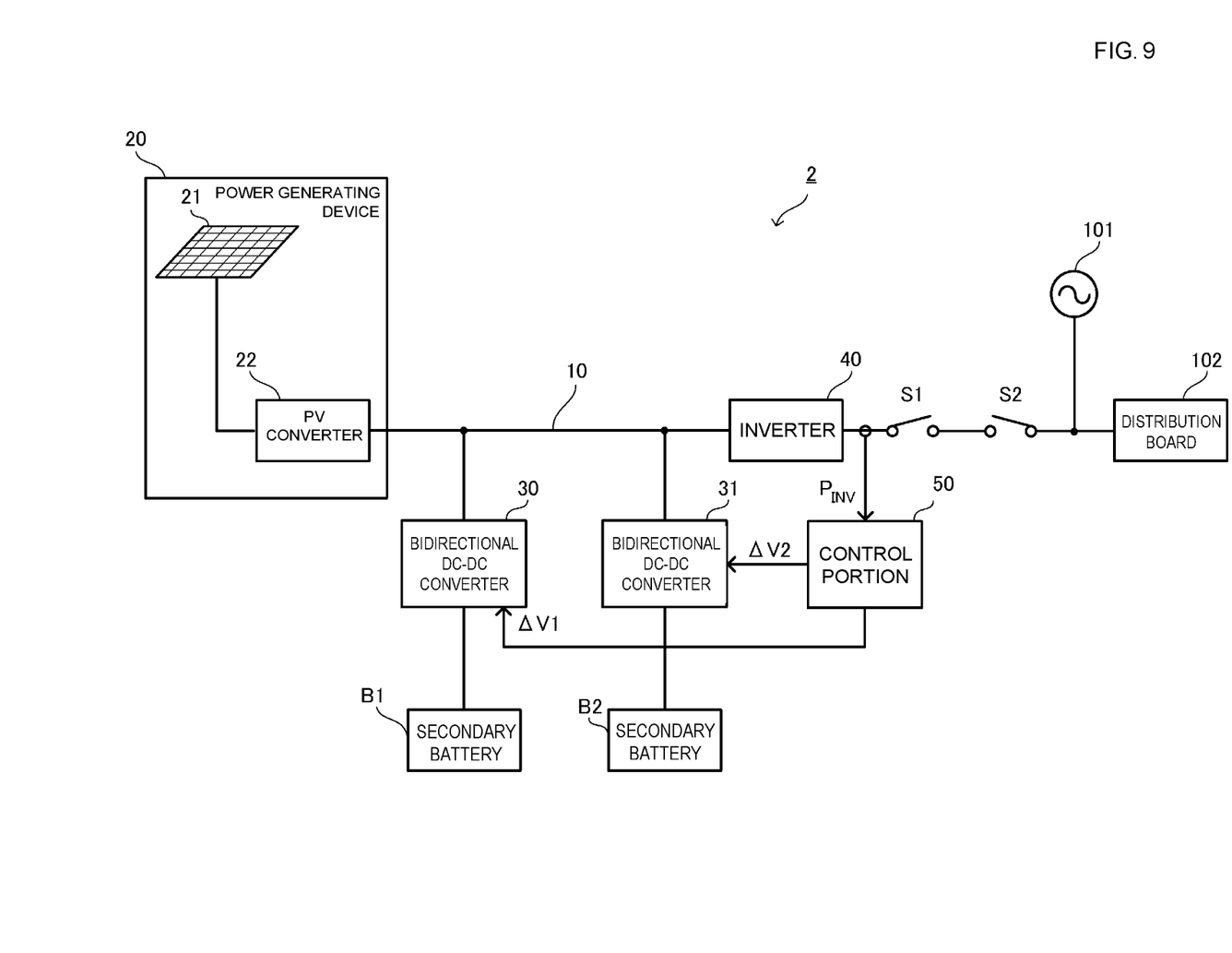
FIG. 9 illustrates an example energy management system according to another exemplary embodiment.

According to another exemplary aspect, the HVDC bus 10 may be connected to a plurality of bidirectional DC-DC converters. FIG. 9 illustrates another example energy management system 2. As shown, in the energy management system 2, the HVDC bus 10 is further connected to a bidirectional DC-DC converter 31. The bidirectional DC-DC converter 31 is connected to a secondary battery B2.

Even in this case, the slope Rd of the gain characteristics of each of the bidirectional DC-DC converters 30 and 31 is equal to that of the inverter 40. The HVDC bus 10 can be brought into the balanced state by adjustment of each of the offset ΔV1 of the gain characteristics of the bidirectional DC-DC converter 30 and the offset ΔV2 of the gain characteristics of the bidirectional DC-DC converter 31. In this case, the powers of the bidirectional DC-DC converters 30 and 31 can be individually adjusted in accordance with the amounts of charging in the secondary batteries B1 and B2. Even in the case where the bidirectional DC-DC converter 31 is added after the energy management system is constructed, the control for bringing the HVDC bus 10 into the balanced state can be easily performed.

REFERENCE SIGNS LIST

B1, B2 secondary battery
S1, S2 switch
10 HVDC bus (direct-current voltage bus)
20 power generating device
21 photovoltaic panel
22 PV converter
30, 31 bidirectional DC-DC converter
40 inverter
50 control portion
51 controller
101 power system
102 distribution board
221 MPPT control section
222 current control section
223 converter section
301 voltage control section
302 current control section
401 voltage control section
402 current control section
403 inverter section

The invention claimed is:

1. An energy management system comprising:
a power generating device configured to generate power;
a direct-current voltage bus coupled to the power generating device to receive the generated power;
at least one bidirectional DC-DC converter connected to the direct-current voltage bus and configured to receive a direct-current voltage from the direct-current voltage bus or output the direct-current voltage to the direct-current voltage bus;
an inverter connected to the direct-current voltage bus and configured to convert the direct-current voltage into an alternating-current voltage, wherein a gain of a voltage change to a current change in the inverter is equal to gain of a voltage change to a current change in the bidirectional DC-DC converter; and
a controller configured to control an output power of the inverter, such that when an output power of the inverter or the bidirectional DC-DC converter varies in response to a variation in an output current of the power generating device, the controller is configured to adjust at least one of an offset of gain characteristics of the bidirectional DC-DC converter to gain characteristics of the inverter or an offset of the gain characteristics of the inverter to the gain characteristics of the bidirectional DC-DC converter to drive the output power of the inverter towards a target value.

2. The energy management system according to claim 1, wherein the at least one bidirectional DC-DC converter comprises a plurality of bidirectional DC-DC converters.

3. The energy management system according to claim 2, wherein the controller is configured to adjust the offset of the gain characteristics for each of the plurality of bidirectional DC-DC converters to drive the output power of the inverter towards the target value in response to a variation in the output power at least one of the inverter or the bidirectional DC-DC converter.

4. The energy management system according to claim 3, further comprising a plurality of secondary batteries that are each respectively coupled to one of the plurality of bidirectional DC-DC converters.

5. The energy management system according to claim 1, wherein the power generating device is a photovoltaic power generating device and is configured to identify and track a current value and a voltage value at which the output power generated by the power generating device is maximized.

6. The energy management system according to claim 1, wherein the controller is configured to compare the output power of the inverter with the target value and to control, based on the comparison, the offset of the gain characteristics of the bidirectional DC-DC converter to the gain characteristics of the inverter to drive the output power of the inverter towards the target value.

7. The energy management system according to claim 6, wherein the target value is selected such that a sum of the output power of the inverter, the generated power output by the power generating device, and the output power of the bidirectional DC-DC converter is zero.

8. The energy management system according to claim 1, wherein the alternating-current voltage is output to at least one of a power system or a distribution board.

* * * * *